(12) United States Patent
Finkenrath et al.

(10) Patent No.: US 7,827,778 B2
(45) Date of Patent: Nov. 9, 2010

(54) POWER PLANTS THAT UTILIZE GAS TURBINES FOR POWER GENERATION AND PROCESSES FOR LOWERING $CO_2$ EMISSIONS

(75) Inventors: Matthias Finkenrath, Bavaria (DE); Michael Bartlett, Bavaria (DE); Arne Lynghjem, Stavanger (NO); Jon Jakobsen, Sola (NO)

(73) Assignees: General Electric Company, Niskayuna, NY (US); STATOIL, Stavanger (NO)

( * ) Notice: Subject to any disclaimer, the term of this patent is extended or adjusted under 35 U.S.C. 154(b) by 1037 days.

(21) Appl. No.: 11/557,243

(22) Filed: Nov. 7, 2006

(65) Prior Publication Data
US 2008/0104958 A1    May 8, 2008

(51) Int. Cl.
F02C 7/08    (2006.01)
(52) U.S. Cl. .................................... 60/39.52
(58) Field of Classification Search ............ 60/772, 60/39.5, 39.52, 781, 39.12
See application file for complete search history.

(56) References Cited

U.S. PATENT DOCUMENTS

| | | | |
|---|---|---|---|
| 4,592,204 A * | 6/1986 | Rice | ............ 60/792 |
| 4,843,517 A | 6/1989 | Maruyama et al. | |
| 5,490,035 A | 2/1996 | Yen et al. | |
| 5,832,712 A | 11/1998 | Ronning et al. | |
| 6,184,324 B1 | 2/2001 | Benz et al. | |
| 6,655,150 B1 | 12/2003 | Aasen et al. | |
| 6,957,539 B2 | 10/2005 | Lebas et al. | |
| 7,503,178 B2 * | 3/2009 | Bucker et al. | ............ 60/774 |
| 2002/0043063 A1 | 4/2002 | Kataoka et al. | |
| 2004/0011057 A1 | 1/2004 | Huber | |
| 2004/0016237 A1 | 1/2004 | Marin et al. | |
| 2004/0170935 A1 | 9/2004 | Lebas et al. | |

(Continued)

FOREIGN PATENT DOCUMENTS

WO    2004072443 A1    8/2004

(Continued)

OTHER PUBLICATIONS

O. Bolland & S. Saether, "New Concepts for Natural Gas Fired Power Plants Which Simplify the Recovery of Carbon Dioxide"; Energy Convers. Mgmt vol. 33, No. 5-8, pp. 467-475, 1992.

(Continued)

Primary Examiner—Michael Cuff
Assistant Examiner—Andrew Nguyen
(74) Attorney, Agent, or Firm—Francis T. Coppa (57) ABSTRACT

Power plants and process for lowering $CO_2$ emissions generally includes extracting a portion of the recirculated $CO_2$-rich flue gas mid-way through the compression pathway of a gas turbine and removing the $CO_2$ in a separation unit. The remaining portion of the $CO_2$ rich flue gas (i.e., the portion of the recirculated flue gas that was not fed to the separation unit) is mixed with fresh air coming from an additional compressor-expander and then fed back to the compression pathway. As a result, flue gas recirculation increases the $CO_2$ concentration within the working fluid, leading to an additional increase in $CO_2$ partial pressure. As the concentration and partial pressure of $CO_2$ is increased, a lower energy penalty is observed to remove the $CO_2$. Moreover, a reduced volume is fed to the $CO_2$ separation unit during operation. Consequently, the size of the separation equipment can be reduced as well as the energy required for the separation process.

28 Claims, 3 Drawing Sheets

U.S. PATENT DOCUMENTS

2005/0028529 A1 2/2005 Bartlett et al.
2005/0132713 A1 6/2005 Neary
2006/0037337 A1 2/2006 Lear, Jr. et al.

OTHER PUBLICATIONS

Thormod Andersen, Hanne M. Kvamsdal and Olav Bolland, "Gas Turbine Combined Cycle With CO2-Capture Using Auto-Thermal Reforming of Natural Gas"; Proceedings of ASME Turbo Expo 2000: Land, Sea, and Air; May 8-11, 2000, Munich, Germany; 2000-GT-162. pp. 1-8.

Olav Bollard, et al.; "Exergy Analysis of Gas-Turbine Combined Cycle With CO2 Capture Using Auto-Thermal Reforming of Natural Gas"; Available from http://www.tev.ntnu.no/GlobalWatch/co2/Bolland_Ertesvaag_Speich,%20AIM%20Liege.pdf; (pp. 6).

Hanne M. Kvamsdal, Ivar S. Ertesvag, Olav Bolland, & Tor Tolstad, "Exergy Analysis of Gas-Turbine Combined Cycle With CO2 Capture Using Pre-Combustion Decarbonization of Natural Gas"; Proceedings of ASME Turbo Expo 2002: Land, Sea, and Air, Jun. 3-6, 2002, Amsterdam, The Netherlands; GT-2002-30411, pp. 1-8.

Olav Bolland, Henriette Undrum; "A Novel Methodology for Comparing CO2 Capture Options for Natural Gas-Fired Combined Cycle Plants"; Advances in Environmental Research 7 (2003) pp. 901-911.

Riti Singh, John Horlock & Tony Haslam; "Cycles for Low Carbon Dioxide Production"; Conference Report and Summary; (pp. 6).

* cited by examiner

POWER PLANTS THAT UTILIZE GAS TURBINES FOR POWER GENERATION AND PROCESSES FOR LOWERING $CO_2$ EMISSIONS

BACKGROUND

The present disclosure generally relates to a process for lowering $CO_2$ emissions in a power plant utilizing fossil fuels for power generation.

Carbon dioxide ($CO_2$) emissions from power plants utilizing fossil fuels are increasingly penalized by national and international regulations, such as the Kyoto protocol, and the EU Emission Trading Scheme. With increasing cost of emitting $CO_2$, $CO_2$ emission reduction is important for economical power generation. Today's $CO_2$ removal technologies concentrate on $CO_2$ clean up of the atmospheric flue gas stream of a power plant, which results in very large, costly and energy intensive $CO_2$ removal units.

Gas turbine plants operate on the Brayton cycle, which generally uses a compressor to compress the inlet air upstream of a combustion chamber. Then the fuel is introduced and ignited to produce a high temperature, high-pressure gas that enters and expands through the turbine section. The turbine section powers both the generator and compressor. Combustion turbines are also able to burn a wide range of liquid and gaseous fuels from crude oil to natural gas.

There are three generally recognized ways currently employed for reducing $CO_2$ emissions from such power stations. The first method is to capture $CO_2$ after combustion with air from the exhaust gas; wherein the $CO_2$ produced during the combustion is removed from the exhaust gases by an absorption process, adsorption process, membranes, diaphragms, cryogenic processes or combinations thereof. This method, commonly referred to as post-combustion capture, usually focuses on reducing $CO_2$ emissions from the atmospheric exhaust gas of a power station. A second method includes reducing the carbon content of the fuel. In this method, the fuel is first converted into $H_2$ and $CO_2$ prior to combustion. Thus, it becomes possible to capture the carbon content of the fuel before entry into the gas turbine and the formation of $CO_2$ is hence avoided. A third method includes an oxy-fuel process. In this method, pure oxygen is used as the oxidant as opposed to air, thereby resulting in a flue gas consisting of carbon dioxide and water.

The main disadvantage of the post-combustion $CO_2$ capture processes is that the $CO_2$ partial pressure is very low on account of the low $CO_2$ concentration in the flue gas (typically 3-4% by volume for natural gas fired power plants) and therefore large and expensive devices are needed for removing the $CO_2$. Although the $CO_2$ concentration at the stack and thus the partial pressure could be increased by partial recirculation of the flue gas to the compressor of the gas turbine (in this respect see, for example, U.S. Pat. No. 5,832,712), it still remains fairly low (about 6-10% by volume). The low CO2 partial pressures and large gas volumes implicit with the form of post-combustion capture leads to very high energy costs related to $CO_2$ removal in addition to very bulky and costly equipment. Both these factors significantly increase the cost of electricity generation.

Accordingly, there is a need for improved processes for efficiently removing $CO_2$ from the power plant.

BRIEF SUMMARY

Disclosed herein are power plants that employ gas turbines and methods for lowering $CO_2$ emission in the power plant that utilize fossil fuels for power generation. The method of generating energy in a power plant including a gas turbine comprises generating a flue gas from a gas turbine, wherein the gas turbine comprises a compression section having at least two stages comprising a low-pressure compressor and a high-pressure compressor, a combustion section fluidly coupled to the compression section, and an expander fluidly coupled to the combustion section; recirculating the flue gas to the low-pressure compressor; diverting a portion of the recirculated flue gas to a carbon dioxide ($CO_2$) separator and a remaining portion to the high-pressure compressor; separating $CO_2$ from the diverted portion in a $CO_2$ separator to generate a $CO_2$ lean gas; and feeding the remaining portion of the recirculated flue gas to the high-pressure compressor.

A power plant configured for lowering $CO_2$ emissions comprises a gas turbine comprising a compression section having at least two stages, the at least two compression stages comprising a low-pressure compressor fluidly coupled to a high-pressure compressor; a combustor having a first inlet adapted for receiving compressed gas, a second inlet adapted for receiving fuel and an outlet adapted for discharging hot flue gas; and a main expander section having an inlet adapted for receiving the hot flue gas and an outlet, the outlet of the main expander fluidly coupled to the low-pressure compressor; and a $CO_2$ separator fluidly coupled to the low-pressure compressor for receiving a portion of the flue gas from the low-pressure compressor and provide a $CO_2$ lean gas that is then fed to an additional expander, wherein a remaining portion of the flue gas is provided directly to the high-pressure compressor via the low-pressure compressor being fluidly coupled to the high-pressure compressor.

In another embodiment, the power plant configured for lowering $CO_2$ emissions comprises a gas turbine comprising a compression section having at least two stages, the at least two compression stages comprising a low-pressure compressor fluidly coupled to a high-pressure compressor; a combustor having a first inlet for receiving compressed gas from the high-pressure compressor, a second inlet for receiving fuel and an outlet for discharging hot flue gas; and a main expander section having an inlet for receiving the discharged hot flue gas and an outlet, the outlet of the main expander fluidly coupled to the low-pressure compressor; and a $CO_2$ separator fluidly coupled to the low-pressure compressor for treating a portion of the flue gas and for providing a $CO_2$ lean gas that is then fed to a humidifier downstream from the $CO_2$ separator to produce a humidified and recuperated flue gas, wherein the humidified flue gas drives a second expander/compressor unit having an outlet in fluid communication with the high-pressure compressor, wherein a remaining portion of the flue gas is provided directly to the high-pressure compressor via the low-pressure compressor being fluidly coupled to the high-pressure compressor.

In another embodiment, the method of generating energy in a power plant comprises a gas turbine generating a flue gas, a combustion section fluidly coupled to a compression section, and an expander fluidly coupled to the combustion section; recirculating the flue gas to a low-pressure compressor; diverting a portion of the recirculated flue gas downstream of the compressor to a carbon dioxide ($CO_2$) separator and a remaining portion to the combustor; separating $CO_2$ from the diverted portion of flue gas in a $CO_2$ separator to generate a $CO_2$ lean gas; and feeding the remaining portion of the recirculated flue gas to the combustor. This system can be used with gas turbines comprising at least two compression stages and this embodiment can also be applied to gas turbines with a single compressor unit, which allows fluid extraction and re-injection downstream of the compressor.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

The present disclosure provides a process for lowering $CO_2$ emissions by separation of $CO_2$ at high-pressures and concentrations in a power plant that utilizes gas turbines for power generation. As will be discussed in greater detail below, high gas pressures are achieved by extracting recirculated $CO_2$-rich flue gas mid-way through the compression pathway of a gas turbine. As a result, flue gas recirculation increases the $CO_2$ concentration within the working fluid, leading to an additional increase in $CO_2$ partial pressure. As the concentration and partial pressure of $CO_2$ is increased, a lower energy penalty is observed to remove the $CO_2$. In addition, due to the $CO_2$ separation at pressure, the volume flows to be treated are significantly reduced compared to atmospheric processes. Consequently, the size of the separation equipment can be reduced as well as the energy required for the separation. In addition, the significant increase in CO2 partial pressure also allows for the selection of alternative CO2 capture methods, for example, adsorption and membrane separation, as described below.

In the process, only a portion (e.g., 10-70%) of the fluid extracted from the gas turbine for intercooling is passed to the $CO_2$ separator with the remaining portion returned to the high-pressure compressor and combustor. Thereby, the partial pressure of $CO_2$ in the gas turbine working fluid is raised while decreasing the volume of gas to be treated in the $CO_2$ separator. The cycle configuration is such that all cycle flue gases exit the system via the $CO_2$ separator, which provides for maximum $CO_2$ capture (preferably over 80%). Fresh air for combustion is compressed in a separate compressor unit and enters the gas turbine cycle at the inlet to the compressor. This avoids dilution of the recirculated $CO_2$-rich flue gas prior to the introduction to the separator. To minimize the work needed to compress the fresh air, the pressurized $CO_2$-lean gas from the $CO_2$ separator can be sent through a separate expander that is preferably but not necessarily linked mechanically to the air compressor. Various heat recovery strategies can be used advantageously to maximize the work generated in the expander. For example, a heat exchanger between the fresh air stream leaving the compressor and the cleaned flue gas stream entering the expander can be employed. In a beneficial alternative configuration, the heat exchange for heat recovery can also take place between the $CO_2$-rich flue gas fed to the separator and the $CO_2$-lean flue gas that leaves the separator.

In a variation of the process, high gas pressures are achieved by extracting recirculated $CO_2$-rich flue gas downstream of the compressor unit. As a result, flue gas recirculation increases the $CO_2$ concentration within the working fluid, leading to an additional increase in $CO_2$ partial pressure. As the concentration and partial pressure of $CO_2$ is increased, a lower energy penalty is observed to remove the $CO_2$. In addition, due to the $CO_2$ separation at pressure, the volume flows to be treated are significantly reduced compared to atmospheric processes. Consequently, the size of the separation equipment can be reduced as well as the energy required for the separation.

Figure 1:
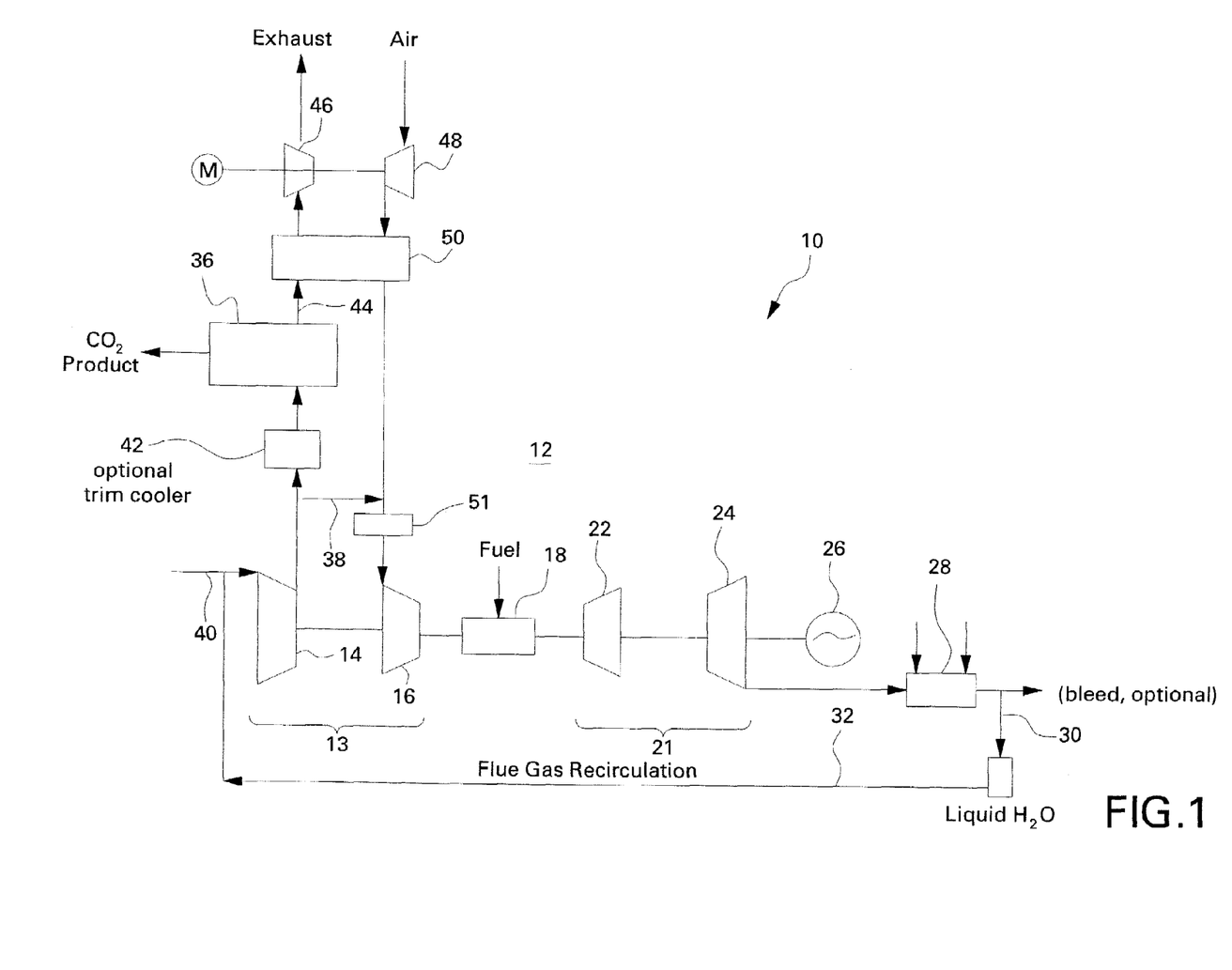
FIG. 1 shows a simplified scheme of a power plant according to one embodiment with two-stage compression and $CO_2$ separation from a partial flow of the extracted compressed gas and reintroduction of a compressed gas consisting of air and recirculated flue gas midway through the compression.

Referring now to FIG. 1, there is illustrated an exemplary power plant 10 with a gas turbine 12. The gas turbine 12 generally includes a compression section 13 that optionally includes at least two compression stages (e.g., a low-pressure compressor 14 fluidly coupled to a high-pressure compressor 16), a combustion chamber 18, and at least one expander section 21 (for example, a high-pressure expander 22 for receiving the combustion fumes and a low-pressure expander 24 downstream from the high-pressure expander 22) for supplying the energy required for driving the compressors 14, 16 and a generator 26 for generating electricity. At start up, the compression section 13 provides a compressed fluid, e.g., air or air enriched with oxygen, to the combustor 18, wherein it is then mixed with fuel 20 and combusted to generate fumes containing water and $CO_2$, among others. The energy in the expander exhaust can be used in a heat recovery bottoming cycle, e.g. steam Rankine cycle, to increase the efficiency, e.g., heat recovery and steam generator 28, wherein the heat is recovered in the form of steam. The gas turbine exit flow can be fully or partly recirculated. The latter can be used for transient operation (start-up, load-change, shut-down). In this case, a fraction or all of the fumes leaving the gas turbine flue gas is bled off and used for the desired transient operation. The aforementioned flue gas (as indicated by reference numeral 32) is then recirculated back to the low-pressure compressor 14 after first being cooled and any liquid water formed being removed in a condenser 30. This device may be configured advantageously to capture particles and gas contaminants. As will be discussed in greater detail below, a portion 34 of the flue gas recirculation 32 is sent compressed to the separator 36 (e.g., 10-70%), while the remaining portion 38 is recycled further on to the high-pressure compressor 16 and combustor 18 to further increase the $CO_2$ concentration in the working fluid.

During operation, recirculated flue gas 32 is compressed to about 2 to 20 bars in the first compressor 14. The fraction of the compressed gas that is sent to the $CO_2$ separator 36 can be optionally cooled by an additional heat exchanger, or trim cooler 42. The remaining fraction that is recirculated back (stream 38) is mixed with fresh air entering the cycle through the additional compressor 48. This mixture is optionally cooled down in an intercooler 51. The basic principle of intercooling includes partly compressing the gas and then cooling it before the final compression to the desired pressure is carried out (i.e., in compressor 16). In this way, the intercooler 51 reduces compression work and thus the power output of the cyclic process is increased. The $CO_2$ separation is effected before final compression. Optionally, trim cooler 42 cools the gas to a temperature level that is desirable for $CO_2$ separation. Advantageously, the existing scrolls of intercooled aeroderivatives, can be utilized to reduce required gas turbine modifications to practice the present process.

The cleaned gas 44 leaving the $CO_2$ separator 36 is expanded in an expander 46. Fresh air is supplied by an additional compressor 48 and mixed with the recirculated low-pressure flue gas portion 38. The mixed gas is intercooled 51 and fed to the high-pressure compressor 16. The expander and air compressor may be coupled in a compressor-expander unit with an additional motor (M). To recover waste heat and reduce power to drive the compressor 16, heat exchange in heat exchanger 50 can take place between the air stream and the cleaned gas stream entering the expander 46. In an alternative configuration, the heat exchange for heat recovery 50 can also take place between the $CO_2$-rich flue leaving the low-pressure compressor 14, and the $CO_2$-lean flue gas that leaves the separator 44.

As discussed above, the flue gas recycle fraction 34 can be used to influence the overall $CO_2$ separation rate. For similar reasons, the fresh airflow to the low-pressure compressor 14 can be adjusted. Firing upstream of the expander unit 46 can be utilized to avoid the motor to drive the compressor 48. To drive the unit, a steam turbine or a common shaft with the gas turbine 12 can also be used. An intercooled air compressor could also be used since it saves compression work. Gas humidification (via e.g., steam or water injection or in a non-adiabatic saturation device) upstream of one of the compressors, the combustor, throughout the expansion, or downstream of the $CO_2$ separation unit 36, can potentially avoid the need for an additional motor as well as can increase the power output and cycle efficiency.

In this process, the flue gas $CO_2$ concentration is increased in the separator compared to classical post-combustion $CO_2$ capture processes. Similarly, since only a portion of the recycled flue gas flows to the separator 36, and more significantly, since the flue gas is at pressure, the volume flow to the separator 36 is greatly reduced compared to atmospheric $CO_2$ capture applications. For example, a 50% flue gas recycle will effectively double the $CO_2$ concentration and compression will increase the $CO_2$ partial pressure by 2-20 times. Consequently, the size requirements and energy requirements of the $CO_2$ separator are reduced. Moreover, the reduced inlet temperature for the high-pressure compressor 16 allows for increased mass flow resulting in higher specific power. In general, the significant increase in $CO_2$ partial pressure also allows for the selection of alternative $CO_2$ capture methods, for example, adsorption and membrane separation, as described below.

Figure 2:
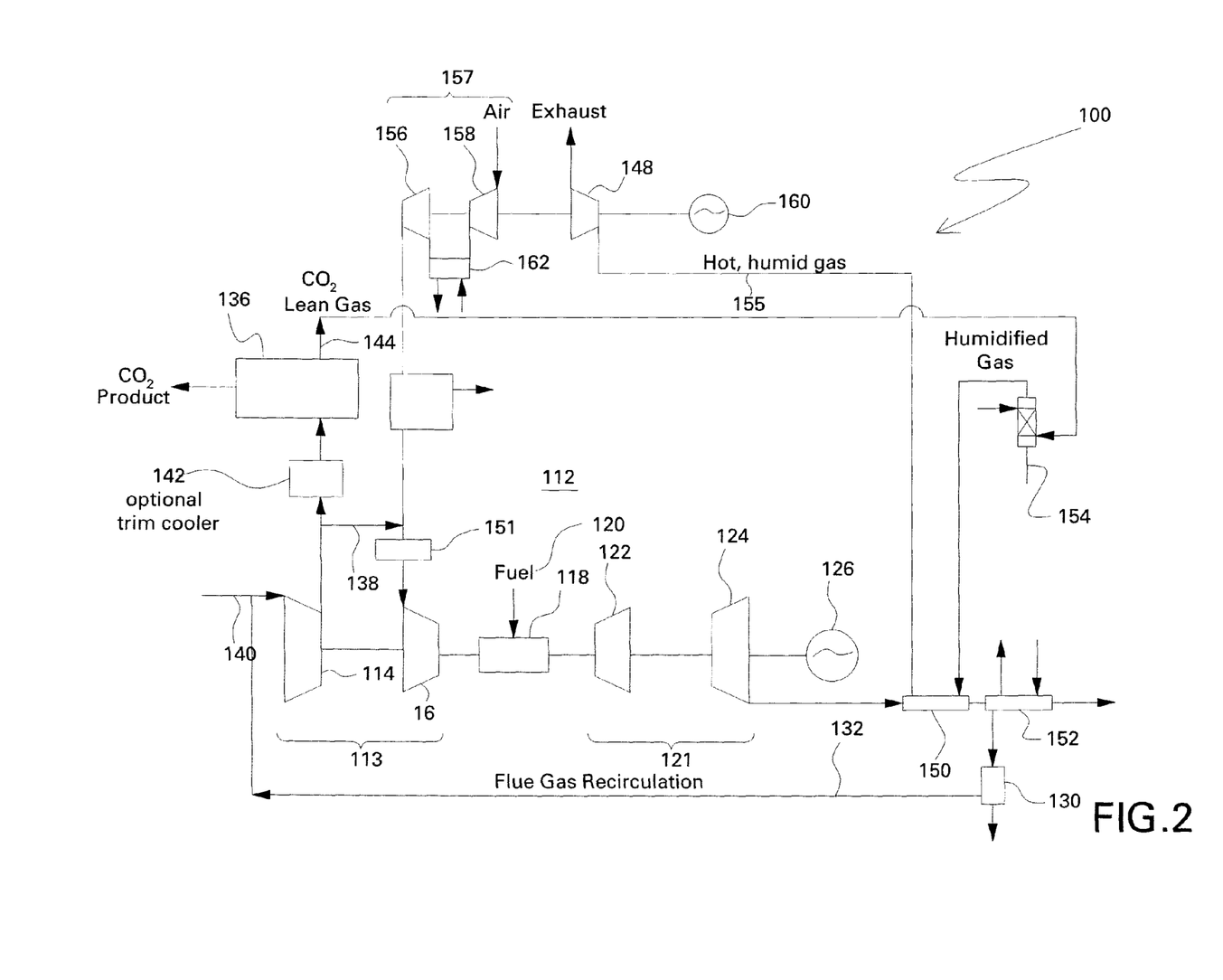
FIG. 2 shows a simplified scheme of a power plant according to another embodiment with two-stage compression and $CO_2$ separation with internal heat recovery using the $CO_2$ lean gas recycle product.

FIG. 2 illustrates an alternative embodiment for a power plant 100. In this embodiment, the $CO_2$-lean gas is used in an internal heat recovery cycle. The $CO_2$-lean gas is recuperated against the main gas turbine outlet stream. Optionally, the $CO_2$-lean gas is humidified prior to this, using low temperature heat from the cycle to saturate the gas. This also generates an additional internal heat sink within the cycle. Potential effects of using internal heat recovery and/or humidification are a power independent air compressor and increased power output. Optionally, the steam bottoming cycle can be reduced in size or eliminated from the plant. The invention proposed includes configurations with two or more gas turbines linked by gas extraction throughout the compression. For $CO_2$ separation by membranes, a vacuum pump or similar can be used on the membrane permeate side to increase driving forces.

The power plant 100 includes a gas turbine 112 having a compression section 113 that includes at least two compression stages (e.g., a low-pressure compressor 114 fluidly coupled to a high-pressure compressor 116), a combustion chamber 118, and at least one expander section 121 (e.g., a high-pressure expander 122 for receiving the combustion fumes and a low-pressure expander 124 downstream from the high-pressure expander 122) for supplying the energy required for driving, among others as may be desired, the compressors 114, 116 and a generator 126. At start up, the compression section 113 provides a compressed fluid, for example, air or air enriched with oxygen, to the combustor 118, wherein it is then mixed with fuel 120 and combusted to generate flue gas containing water and $CO_2$, among others. The flue gas is fed to a recuperator 150 and economizer 152, wherein the heat is recovered. The recuperator 150 captures waste heat in the turbine exhaust stream to preheat the $CO_2$ lean exhaust before entering expander 148 whereas the economizer captures low-grade heat to drive the optional humidification of the $CO_2$-lean gas. As before, the flue gas from the expander section 121 can be fully or partly recirculated. When partly recirculated, a fraction of the flue gas leaving the gas turbine flue gas is bled off and used for transient operation (start-up, load-change, shut-down) after first being cooled and any liquid water formed being removed in a condenser 30. This device may be configured advantageously to capture particles and gas contaminants. The thus treated flue gas (as indicated by reference numeral 132) is then recirculated back to the low-pressure compressor 114. As will be discussed in greater detail below, a portion 134 of the flue gas recirculation is sent at increased $CO_2$ partial pressure to the $CO_2$ separator, 136, (e.g., 10-70%) while the remaining portion 138 is recycled further on to the high-pressure compressor 116 and combustor 118.

During operation, recirculated flue gas 132 is compressed to about 2 to 20 bars in the first compressor 114. The fraction of the compressed gas that is sent to the $CO_2$ separator 136 can be optionally cooled by an additional heat exchanger, or trim cooler 142. The remaining fraction that is recirculated back (stream 138) is mixed with fresh air entering the cycle through the additional compressor section 157 (which is optionally an intercooled additional compressor unit consisting of two or more compressors, 158 and 156, and an intercooler (162)). The mixture of recirculated flue gas and fresh air is optionally cooled down in an intercooler 164 and recycled back to the high-pressure compressor 116 and combustor 118. The cleaned $CO_2$ lean gas 144 exiting the separator 136 is optionally humidified in a humidification tower 154 to provide a humidified gas 155 and expanded in an expander 148. By introducing the humidified $CO_2$ lean gas 155 directly to the expander 148, a motor for operation of compression section 157 that is coupled to the expander 148 can be avoided or minimized. Moreover, the expander 148 can be used to drive a generator 160, if desired. It should be apparent that low temperature waste heat from e.g., 164, 152, 162, can be used to drive the humidification of the $CO_2$-lean gas. This low-grade energy is delivered to the humidification tower in the form of hot pressurized water, which humidifies the $CO_2$ lean gas in a counter-current fashion while the water itself is being cooled. The use of this low-grade energy in this manner increases the efficiency of the power plant 100 by generating an internal heat sink (i.e., the cold water exiting from the tower).

The compression section optionally includes a low-pressure compressor 158 coupled to a high-pressure compressor 156. Fresh air (or air enriched with oxygen) is supplied to low-pressure compressor 158 and further compressed within the high-pressure compressor 156. Optionally, the gas can be cooled in an intercooler disposed between the compressors. The gas is then mixed with the recirculated low-pressure flue gas portion 138, which is then fed to an intercooler 164 prior to entering the high-pressure compressor 116. The enthalpy in the hot water generated in the optional intercooler can be used to saturate the gas passing therethrough or the CO2-lean gas prior to expander 48, 148.

Advantageously, by using the $CO_2$ lean gas as described in the above internal heat recovery process, power output is increased and the compressor is power independent. Optionally, the conventional steam bottoming cycle can be eliminated or reduced in size with the couples unit 157, 148 providing a net power output.

The disclosed methods have been modeled in GateCycle. The simulations confirm the main effect of flue gas recycling back to combustor. When recycling 50% of the flue gas back to the high-pressure compressor, 116, the driving forces for separation of $CO_2$ at the $CO_2$ separator 136 are doubled and the volume flow is halved, thus reducing the associated capital and energy demands. A further reduction of volume flows and increases in $CO_2$ partial pressures at the $CO_2$ separation unit, and thereby reductions in costs and energy demands, is due to the $CO_2$ separation unit operating at pressure. Moreover, the cycle configuration is such that in normal operation all cycle flue gases exit the system via the $CO_2$ separator. This ensures maximum $CO_2$ capture (preferably over 80%). Still further, fresh air for combustion is compressed separately to the main gas turbine unit and enters the gas turbine cycle at the inlet to the high-pressure compressor. This avoids dilution of the recirculated $CO_2$-rich exhaust gas prior to introduction to the separator. To minimize the work needed to compress the fresh air, the pressurized $CO_2$-lean gas from the removal unit is sent through a separate expander that is mechanically linked to the air compressor. Various heat recovery strategies can be used advantageously to maximize the work generated in the expander. For example, heat exchange between the fresh air stream leaving the compressor and the cleaned flue gas stream entering the expander.

In all the concepts described, the $CO_2$ separation processes could comprise, for example, a chemical absorption process, which uses an amine-based solvent or the like. In a conventional manner, the working medium would be brought into contact with the solvent in an absorption tower, where $CO_2$ is transformed from the gas to the liquid phase and a $CO_2$ lean gas emerges. Alternatively, a diaphragm (membrane) can act as contact element. This has the advantage that the two flows are kept separate and transfer of the solvent into the gas flow is prevented and thus the turbomachines are protected. In addition, the overall size, weight and costs can be reduced. The solvent issuing from the absorber or the diaphragm unit and enriched with $CO_2$ is regenerated in a separation column and recirculated in order to be used again. Other examples for a $CO_2$ separation process are physical absorption, combinations of chemical and physical absorption, adsorption on solid bodies, and combinations thereof.

It should be noted that if the air (40, 140, or entering 48, 158) is enriched with oxygen, the volume of air introduced for the combustion process is reduced and the buildup of $CO_2$ is improved. Hence, an even lower flow of gas is passed through the separator.

A considerable advantage of the high-pressure separation process disclosed herein over, for example, the oxy-fuel concepts consists in the fact that the existing turbomachines can be used with only slight changes. This is possible because the properties of the working medium are very similar to those in existing gas turbines.

Humidification prior to 16/116 or 48/148 can be realized either by water injection, steam injection or by the use of a humidification tower. All three methods compensate for the loss of the $CO_2$ from the working medium by the addition of water vapor. Hence, the volume flow through the respective expanders are boosted and more power is generated. Further, when using existing turbomachinery, the predetermined design conditions at the inlet of the expander can thereby be reestablished and the performance of the process could be improved.

Figure 3:
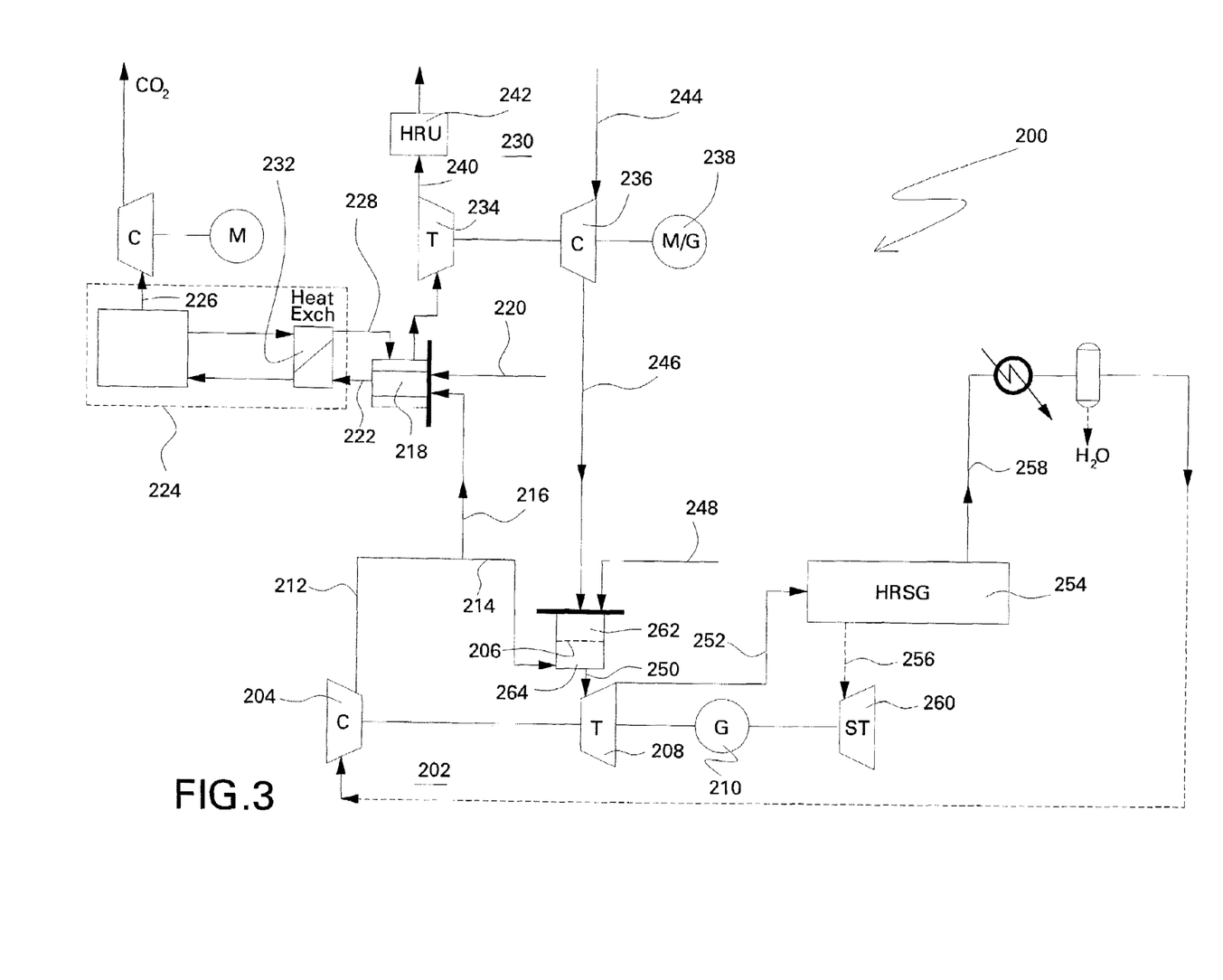
FIG. 3 shows a simplified scheme of a power plant according to another embodiment with $CO_2$ separation from a partial flow of recirculated exhaust that is extracted downstream of the compressor.

FIG. 3 illustrates an alternative embodiment for a power plant 200 comprising a gas turbine 202. The gas turbine 202 generally includes a compressor 204, a combustion chamber 206, and at least one expander section 208 for supplying the energy required for driving compressor 204 and a generator 210 to generate electricity. In one embodiment, a compressed flow 212 from compressor 204 is split into two portions, a first portion 214 that is directed into combustion chamber 206 and a second portion 216 that is directed into a secondary combustor 218. In the secondary combustor 218, the second portion 216 of the compressed flow 212 is combusted with an additional fuel 220, for example, natural gas. This is done in order to reduce the oxygen content of the second portion 216 and to maximize the $CO_2$ concentration.

A $CO_2$ rich stream 222 is produced in secondary combustor 218 and is directed to a $CO_2$ capture system 224 where the $CO_2$ 226 is separated from the $CO_2$ rich stream 222 and a $CO_2$ lean stream 228 is directed to a secondary turbine system 230 for generating additional power. Optionally, the system can include a number of heat exchange interfaces, for example, the $CO_2$ rich stream 222 and the $CO_2$ lean stream 228 can be directed through a heat exchanger 232 to facilitate heat exchange therebetween. Additionally, a heat exchanger 234 can be directly incorporated into secondary combustor 218 to provide additional heat exchange between the combustion gases and the $CO_2$ lean stream 228 and to provide cooling to the secondary combustor materials.

The secondary turbine system 230 comprises a secondary turbine 234 and a secondary compressor 236. The $CO_2$ lean stream 228 is directed to secondary turbine 234 and is expanded to generate additional power through a motor-generator 238. An exhaust gas 240 is generated after expansion through the secondary turbine 234 and can be released to the ambient, typically, after passing through a heat recovery unit 242 to recover any residual heat. Because, the exhaust gas 240 has been stripped of a significant portion of $CO_2$ in $CO_2$ capture system 224, the exhaust 240 is substantially free of $CO_2$ and can be released to the atmosphere in an environmentally sound fashion.

Air 244 is directed through secondary compressor 236, which compressor 236 is typically powered by turbine 234, and generates a compressed air stream 246. The compressed air stream 246 is directed to the combustion chamber 206 for combustion with a primary fuel 248 and the first portion 214 of compressed flow 212 and generates a hot flue gas 250. The hot flue gas 250 is expanded in the expander section 208 to generated electricity via generator 210 and an expanded exhaust 252. The expanded exhaust 252 is directed to a heat recovery steam generator 254 to generate steam 256 and a cooled expanded exhaust gas 258. The steam 256 is directed to a steam turbine 260 for expansion and generation of additional electricity. The cooled expanded exhaust gas 258 is directed to the compressor 204. The expanded exhaust gas 258 is typically cooled down to an appropriate temperature to enable water removal and then is directed to compressor 204 where the exhaust gas is compressed.

In one embodiment of the invention, the combustion chamber 206 comprises a primary combustion zone 262 and a secondary combustion zone 264. In one embodiment, the compressed air 246 and the primary fuel 248 are directed to the primary combustion zone 262 and are combusted and the first portion 214 of the compressed flow 212 is directed to the secondary combustion zone 264.

In one embodiment, a catalytic combustion device (not shown) may be used to remove oxygen from the CO2 rich stream 222 prior to entry into the CO2 capture system 224. Some separation methods will benefit from a reduced partial pressure of oxygen, for example, many solvents used for CO2 capture degrade at a speed that is roughly proportional to the partial pressure of oxygen. Accordingly, removal of the oxygen will benefit the overall system effectiveness. While this configuration is demonstrated in this embodiment, it is equally applicable to all embodiments of the instant invention.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of generating energy in a power plant including a gas turbine, the method comprising:
   generating a flue gas from a gas turbine, wherein the gas turbine comprises a compression section having at least two stages comprising a low-pressure compressor and a high-pressure compressor, a combustion section fluidly coupled to the compression section, and an expander fluidly coupled to the combustion section;
   recirculating the flue gas to the low-pressure compressor;
   diverting a portion of the recirculated flue gas to a carbon dioxide ($CO_2$) separator and a remaining portion to the high-pressure compressor;
   separating $CO_2$ from the diverted portion in the $CO_2$ separator to generate a $CO_2$ lean gas; and
   expanding the $CO_2$ lean gas coming from the $CO_2$ separator in a separate expander.

2. The method of claim 1, further comprising mixing fresh air with the remaining portion of the recirculated flue gas prior to diverting to the high pressure-compressor.

3. The method of claim 1, wherein diverting to the $CO_2$ separator comprises cooling the flue gas portion in a heat exchanger prior to entering the $CO_2$ separator.

4. The method of claim 1, wherein the remaining portion of the recirculated gas flows through an intercooler before entering the high-pressure compressor.

5. The method of claim 1, wherein the portion of the flue gas to the $CO_2$ separator is about 10 to about 70 percent of the recirculated flue gas.

6. The method of claim 1, further comprising humidifying the remaining portion of the recirculated gas prior to flowing to the high-pressure compressor.

7. The method of claim 1, wherein the separate expander is mechanically linked to an oxidant compressor.

8. The method of claim 1, further comprising preheating the $CO_2$ lean gas coming from the $CO_2$ separator in a gas/gas heat exchanger prior to entering the separate expander.

9. The method of claim 1, further comprising humidifying the $CO_2$ lean gas; and feeding the humidified $CO_2$ lean gas to the separate expander, wherein the separate expander is an expander of a compressor/expander, wherein the compressor/expander is power independent.

10. The method of claim 1, wherein separating the $CO_2$ from the diverted portion in the $CO_2$ separator removes greater than 50 percent of the $CO_2$.

11. The method of claim 1, wherein all of the flue gas from the gas turbine exits the power plant via the $CO_2$ separator.

12. The method of claim 1, further comprising bleeding off a portion or all of the flue gas for transient operations or mixing with air prior to entry into said low-pressure compressor.

13. The method of claim 1, wherein the flue gas exits the low-pressure compressor at a pressure of 2 to 20 bars.

14. The method of claim 1, further comprising mixing fresh air with the remaining portion of the recirculated flue gas and cooling the mixture prior to diverting to the high pressure-compressor.

15. The method of claim 1, wherein the flue gas is cooled in a heat exchanger prior to recirculation to the low pressure-compressor such that a part of its water content is condensed and separated.

16. A power plant configured for lowering $CO_2$ emissions, the power plant comprising:
   a gas turbine comprising a compression section having at least two stages, the at least two compression stages comprising a low-pressure compressor fluidly coupled to a high-pressure compressor;
   a combustor having a first inlet adapted for receiving compressed gas, a second inlet adapted for receiving fuel and an outlet adapted for discharging hot flue gas; and a main expander section having an inlet adapted for receiving the hot flue gas and an outlet, the outlet of the main expander fluidly coupled to the low-pressure compressor; and
   a $CO_2$ separator fluidly coupled to the low-pressure compressor for receiving a portion of the flue gas from the low-pressure compressor and provide a $CO_2$ lean gas that is then fed to an additional expander, wherein a remaining portion of the flue gas is provided directly to the high-pressure compressor via the low-pressure compressor being fluidly coupled to the high-pressure compressor.

17. The power plant of claim 16, further comprising a heat exchanger intermediate the $CO_2$ separator and the low-pressure compressor for treating the portion of the flue gas from the low-pressure compressor.

18. The power plant of claim 16, further comprising a device arranged for generating steam at an outlet of the expander and fluidly coupled to the low-pressure compressor.

19. The power plant of claim 16, further comprising an intercooler for fluidly receiving and cooling the recirculated flue gas prior to introduction into the high-pressure compressor.

20. The power plant of claim 16, further comprising a heat recovery and steam generator at the outlet of the main gas turbine expander for treating the hot flue gases prior to recirculating the flue gas to the low-pressure compressor.

21. The power plant of claim 16, further comprising linking the gas turbine with at least one additional gas turbine.

22. A power plant configured for lowering $CO_2$ emissions, the power plant comprising:
   a gas turbine comprising a compression section having at least two stages, the at least two compression stages comprising a low-pressure compressor fluidly coupled to a high-pressure compressor;
   a combustor having a first inlet for receiving compressed gas from the high-pressure compressor, a second inlet for receiving fuel and an outlet for discharging hot flue gas; and
   a main expander section having an inlet for receiving the discharged hot flue gas and an outlet, the outlet of the main expander fluidly coupled to the low-pressure compressor; and a $CO_2$ separator fluidly coupled to the low-pressure compressor for treating a portion of the flue gas and provide a $CO_2$ lean gas that is then fed to a humidifier downstream from the $CO_2$ separator to produce a humidified flue gas and recuperated, wherein the humidified flue gas drives a second expander/compressor unit having an outlet in fluid communication with the high-pressure compressor, wherein a remaining portion of the flue gas is provided directly to the high-pressure compressor via the low-pressure compressor being fluidly coupled to the high-pressure compressor.

23. The power plant of claim 22, further comprising a heat exchanger intermediate the outlet of the second expander/compressor and the high-pressure compressor.

24. The power plant of claim 22, further comprising a heat exchanger disposed intermediate the low-pressure compressor and the $CO_2$ separator.

25. The power plant of claim 22, wherein the second expander/compressor comprises a low-pressure compressor, a high-pressure compressor and an intercooler intermediate the low-pressure compressor and the high-pressure compressor.

26. The power plant of claim 22, further comprising a heat exchanger at the outlet of the main gas turbine expander for treating the hot flue gas and the humidified flue gas prior to recirculating the flue gas to the low-pressure compressor and the second expander/compressor unit.

27. The power plant of claim 22, further comprising linking the gas turbine with at least one additional gas turbine.

28. The power plant of claim 22, further comprising an intercooler for fluidly receiving and cooling the remaining portion of the recirculated flue gas prior to introduction into the high-pressure compressor.

* * * * *